(12) United States Patent
Prevo et al.

(10) Patent No.: US 9,310,476 B2
(45) Date of Patent: Apr. 12, 2016

(54) METHOD FOR DETECTING A DISTANCE, A RADAR SYSTEM AND A COMPUTER PROGRAM PRODUCT

(75) Inventors: René Prevo, Leimuiden (NL); Johannes Antonius Andreas Janssen, Delft (NL); Robért Michael Evert van Heijster, Oegstgeest (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 568 days.

(21) Appl. No.: 13/379,098

(22) PCT Filed: Jun. 17, 2010

(86) PCT No.: PCT/NL2010/050375
§ 371 (c)(1),
(2), (4) Date: Mar. 19, 2012

(87) PCT Pub. No.: WO2010/147469
PCT Pub. Date: Dec. 23, 2010

(65) Prior Publication Data
US 2012/0169529 A1    Jul. 5, 2012

(30) Foreign Application Priority Data
Jun. 17, 2009    (EP) .................................... 09163020

(51) Int. Cl.
*G01S 13/84* (2006.01)
*G01S 13/34* (2006.01)
(Continued)

(52) U.S. Cl.
CPC ................ *G01S 13/34* (2013.01); *F42C 13/045* (2013.01); *G01S 7/354* (2013.01); *G01S 13/345* (2013.01); *G01S 13/505* (2013.01); *G01S 13/84* (2013.01); *G01S 13/882* (2013.01)

(58) Field of Classification Search
CPC .................................. G01S 13/34; G01S 13/84
USPC .................................................... 342/128, 193
See application file for complete search history.

(56) References Cited

U.S. PATENT DOCUMENTS 2,453,169 A    11/1948  Varian
3,026,515 A *  3/1962   Rey ................................ 342/83

(Continued)

FOREIGN PATENT DOCUMENTS

EP    0356422    11/1988
EP    0416745    3/1991

(Continued)

OTHER PUBLICATIONS

International Search Report, EP Patent Office, PCT/NL2010/050375, dated Aug. 16, 2010.

(Continued)

*Primary Examiner* — Matthew M Barker
(74) *Attorney, Agent, or Firm* — Banner & Witcoff, Ltd.

(57) ABSTRACT

The invention relates to a method for detecting a distance between a radar system and a reflecting surface. The method comprises the steps of transmitting a frequency modulated continuous wave (FMCW) radar signal from the radar system and receiving a reflected FMCW radar signal being the transmitted signal that has been reflected by the reflecting surface. Further, the method comprises the steps of providing a beat signal having a frequency that is equal to the frequency difference between the transmitted signal and the received signal and determining harmonics of the beat signal. The method also comprises the step of using phase shift information of at least one of said harmonics for determining a distance between the radar system and the reflecting surface.

18 Claims, 12 Drawing Sheets

(51) Int. Cl.
- *F42C 13/04* (2006.01)
- *G01S 7/35* (2006.01)
- *G01S 13/50* (2006.01)
- *G01S 13/88* (2006.01)

(56) References Cited

U.S. PATENT DOCUMENTS

| | | | |
|---|---|---|---|
| 3,116,483 A * | 12/1963 | Fiocco | 342/102 |
| 3,149,330 A * | 9/1964 | Fiocco | 342/102 |
| 3,226,717 A | 12/1965 | Benjamin | |
| 3,872,475 A | 3/1975 | Yamanaka et al. | |
| 4,660,040 A | 4/1987 | Grandos | |
| 4,856,893 A * | 8/1989 | Breen | 356/5.09 |
| 5,343,404 A * | 8/1994 | Girgis | 702/72 |
| 5,619,208 A * | 4/1997 | Tamatsu et al. | 342/70 |
| 5,826,216 A * | 10/1998 | Lyons et al. | 702/143 |
| 6,040,796 A * | 3/2000 | Matsugatani et al. | 342/70 |
| 6,580,385 B1 * | 6/2003 | Winner et al. | 342/70 |
| 2002/0144619 A1 | 10/2002 | Rawcliffe et al. | |
| 2003/0052814 A1 | 3/2003 | Corbrion et al. | |

FOREIGN PATENT DOCUMENTS

| | | |
|---|---|---|
| GB | 862059 A | 3/1961 |
| WO | 88/08545 | 1/1988 |
| WO | 98/38526 | 3/1998 |
| WO | 2005003811 | 1/2005 |

OTHER PUBLICATIONS

New generation artillery proximity sensor application to naval fuzes in 52nd Annual Fuze Conference, May 13-15, 2008, Sparks, "Smart Fuzing—Adding Intelligence to Fuzing solutions" by Max Perrin.

* cited by examiner

METHOD FOR DETECTING A DISTANCE, A RADAR SYSTEM AND A COMPUTER PROGRAM PRODUCT

CROSS REFERENCE TO RELATED APPLICATION

This application is a National Stage application of copending PCT application PCT/NL2010/050375 filed Jun. 17, 2010, which claims the benefit of EP application number 09163020.2 filed Jun. 17, 2009. These applications are incorporated herein by reference in their entireties.

The invention relates to a method for detecting a distance between a radar system and a reflecting surface, comprising the steps of transmitting a frequency modulated continuous wave (FMCW) radar signal from the radar system, receiving a reflected FMCW radar signal being the transmitted signal that has been reflected by the reflecting surface, providing a beat signal having a frequency that is equal to the frequency difference between the transmitted signal and the received signal and determining harmonics of the beat signal.

Such methods are generally known, e.g. for detecting a height. Most contemporary algorithms for FMCW radar height detection measure the frequency difference of the transmitted and received signals. This frequency difference is linear dependent on the height: multiplying the transmitted by the received signal results in a beat signal with a frequency equal to the frequency difference between the transmitted and received signal.

A standard approach to measure the frequency difference is to use a filter bank or a FFT. An analogue filter bank has the disadvantage that it is fixed at a limited number of frequencies (and thus height ranges) and that the slope of the filter has to be very steep to achieve accurate height detections. The later also holds for a digital filter bank. Applying a FFT requires the acquisition of a large number of samples, and hence introduces a delay that is equal or larger than the delay of a filter bank.

A second approach is to use the amplitude relationships between harmonics of the beat signal. The amplitude, however, is not a robust measure for the height due to surface scattering. Especially, when the distance between the radar and the surface changes rapidly, there is usually not sufficient time to collect and average multiple measurements to reduce the noise in the harmonic's amplitudes.

It is noted that patent publication U.S. Pat. No. 3,872,475 discloses a method and apparatus for measuring a distance to a moving target using frequency-modulated continuous waves. After mixing a transmitted wave and a reflected wave a decomposition into Bessel functions is performed. It is an object of the invention to provide a more accurate method according to the preamble for detecting a distance between a radar system and a reflecting surface. Thereto, according to the invention, the step of determining harmonics of the beat signal is performed by Fourier decomposition. Further, the method according to the invention comprises the step of using phase shift information of at least one of said harmonics for determining a distance between the radar system and the reflecting surface.

The invention is partly based on the insight that, as a function of the distance between the radar system and the reflecting surface, phase shifts occur in the harmonics of the beat function. By using such phase shift information a specific distance between the radar system and the reflecting surface can be determined. It appears that this approach enhances the accuracy of the method considerably. Further, the method becomes virtually independent on the surface scatter type and reduces the influences of noise.

Preferably, the step of using phase shift information comprises determining a phase difference between a pair of beat signal harmonics. By using phase difference information between a pair of harmonics, the insight is exploited that the phase shifts occur at regular intervals, except at the main lobe of a sinc function factor in the harmonics phase. When, in a certain application, the distance between the radar system and the reflecting surfaces reduces in a monotone manner, the phase difference between the pair of harmonics may remain constant, while a sudden shift in the phase difference occurs when a specific distance is reached, thereby enabling an accurate distance detection.

In this context it is noted, that, in principle, also the absolute phase of a single harmonic can be monitored to check when a phase shift occurs. Such a phase shift can e.g. be determined by analyzing when the above-mentioned sinc function factor in the harmonics phase changes sign.

By determining multiple phase differences, multiple distances can be determined. Specifically, when the method also comprises checking whether subsequent detected distances correspond with an expected distance evolution, e.g. when varying the distance between the radar system and the reflecting surface in a monotone manner, the robustness of the method improves, e.g. against false detections.

In an advantageous embodiment according to the invention, the angular sweep frequency of the FMCW radar signal is set so as to allow a particular associated phase shift in a harmonic or between harmonics to correspond to a pre-determined distance between the radar system and the reflecting surface. As a result, a pre-set distance can be detected.

Further, the invention relates to a radar system.

Additionally, the invention relates to a computer program product. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

Other advantageous embodiments according to the invention are described in the following claims.

By way of example only, embodiments of the present invention will now be described with reference to the accompanying figures in which FIG. 1 shows a schematic view of a radar system according to the invention;

The figures are merely schematic views of preferred embodiments according to the invention. In the figures, the same reference numbers refer to equal or corresponding parts.

Figure 1:
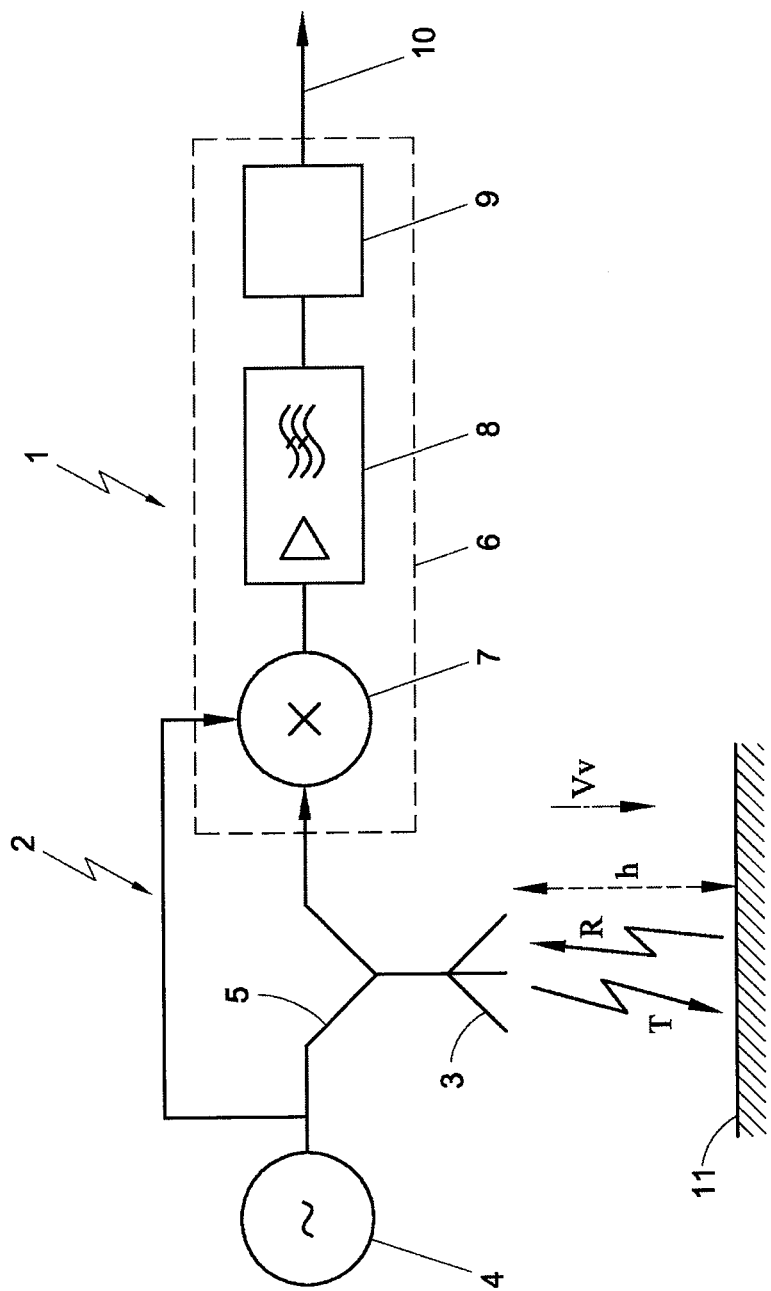

FIG. 1 shows a schematic view of a radar system 1 according to the invention. The radar system 1 comprises a transmitter module arranged for transmitting a frequency modulated continuous wave (FMCW) radar signal T. The system 1 also comprises a receiver module arranged for receiving a reflected FMCW radar signal R being the transmitted signal that has been reflected by the reflecting surface. The transmitter module and the receiver module have been integrated into a single transceiver module 2 for both transmitting and receiving FMCW radar signals. The transceiver module 2 comprises an antenna element 3, a generator 4 for generating the signal to be transmitted and a splitter 5 for splitting the transmitted radar signal T and the received radar signal R. It is noted that, as an alternative, the transmitter module and the receiver module can also be implemented as separate modules.

The radar system 1 shown in FIG. 1 further comprises a processing unit 6 that is arranged for performing a number of processing tasks. The processing unit 6 includes a mixer 7, a filter 8 and a processor 9 including an ADC unit for generating a digital output signal 10. The radar system 1 according to the invention can typically be used for detecting the height while fast ascending or descending. Specific applications include altitude measurements in planes, ignition height detection in fuses or missiles, or altitude detection in space explorers.

During operation of the radar system 1, the generator 4 produces a signal to be transmitted, which is frequency modulated, producing a triangular linear FM sweep. The signal is fed to the antenna element 3. The signal is transmitted by the antenna 3 as a transmitted signal T, reflected by a reflecting surface 11, such as the Earth's surface, and received back by the antenna element 3 as a reflected signal R. Due to a distance, e.g. a height (h), between the radar system and a reflecting surface 11, the signal will be attenuated and delayed. Due to the vertical velocity ($v_v$) of the FMCW radar transceiver, the signal will be affected by Doppler. The signal received by the antenna is fed to the mixer 7 where it is multiplied by the transmitted signal to obtain a signal that has been mixed to base band. The resulting signal is fed to the filter-amplifier where it is low pass filtered. The amplified low frequency signal, called the beat signal, is converted to digital.

It is noted that in the shown embodiment, the radar system is arranged for detecting a height above the Earth's surface 11. However, the radar system can in principle also be applied for detecting another distance type, e.g. a horizontal offset between the radar system and a reflecting wall.

Figure 2:
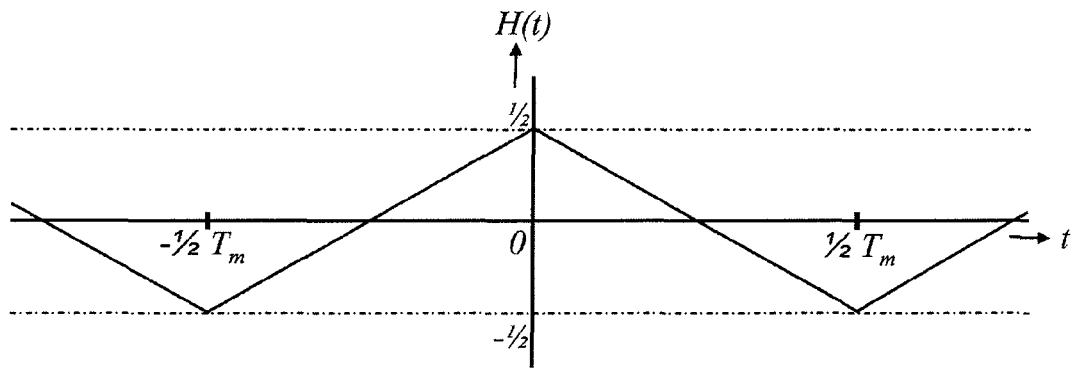
FIG. 2 shows a triangular linear sweep signal.

The detection principle uses a triangular modulated FMCW signal. FIG. 2 shows a triangular linear sweep H(t) being defined as:

$$H(t) = \frac{1}{2} - \frac{2t}{T_m}: 0 < t < \frac{T_m}{2} \quad (1)$$

$$H(t) = \frac{1}{2} + \frac{2t}{T_m}: -\frac{T_m}{2} < t < 0$$

$$H(t) = H(t - n \cdot T_m): n = 0; \pm 1; \pm 2; \ldots$$

where $T_m$ denotes the periodicity of the triangular modulation [s] and t denotes time. The transmitted signal can be described as:

$$S_T(t) = A_T \cos(\omega_c t + \omega_s H(t) t)$$

where:

$A_T$: The transmitted RF amplitude $\omega_c$: Angular centre frequency of $f_c$ [rad/s]

$\omega_s$: Angular sweep frequency of $f_s$ [rad/s]

Here, $f_c$ denotes a central frequency in the frequency sweep of the transmitted signal while $f_s$ denotes a sweep frequency of the transmitted signal. The transmitted signal is reflected by the Earth's surface and will reach the FMCW radar transceiver with a delay proportional to the height:

$$t_d = 2h/c \quad (2)$$

where:

$t_d$: Delay time [s]

h: Height of the FMCW radar transceiver [m]

c: Speed of light [m/s]

The received signal is the delayed version of the transmitted signal:

$$S_R(t) = A_R \cos(\omega_c(t - t_d) + \omega_s H(t - t_d)(t - t_d)) \quad (3)$$

where $A_R$ denotes the received RF amplitude.

Figure 3:
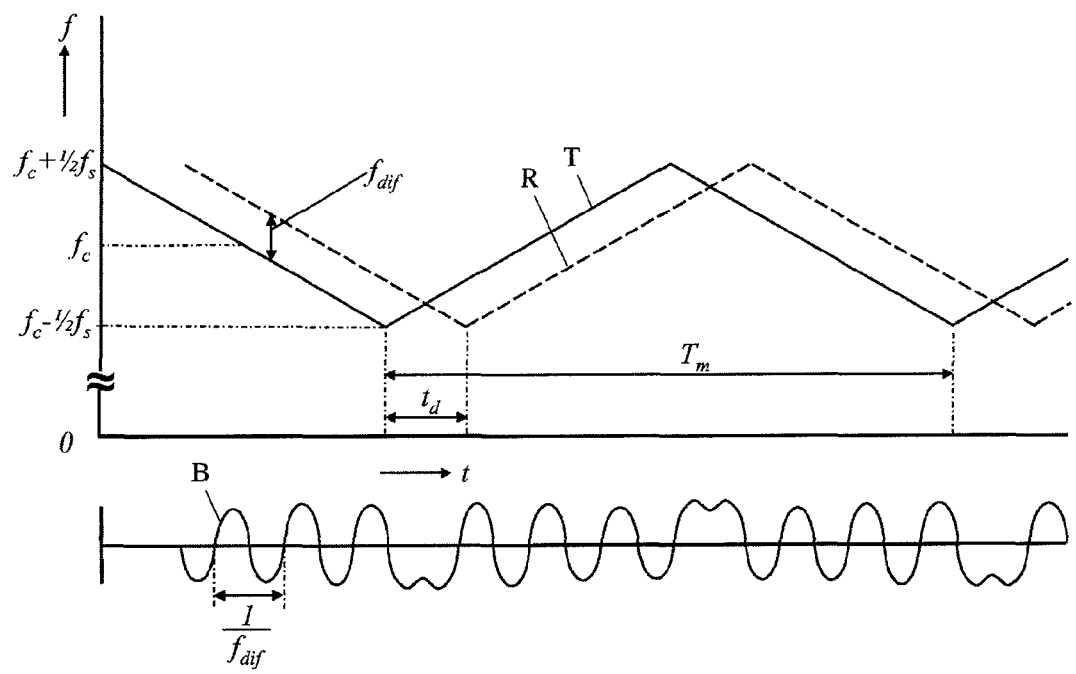
FIG. 3 shows beat signal characteristics.

FIG. 3 shows beat signal characteristics. More specifically, FIG. 3 shows the relation between the transmitted signal T and the received signal R in terms of frequency difference $f_{dif}$ (upper part) and the resulting beat signal B (lower part). Because the transmitted signal is frequency modulated with a triangular waveform the delay $t_d$ between the transmitted and the received signal corresponds to a frequency difference between the transmitted and received signal. The angular difference frequency is equal to:

$$\omega_{dif} = 2\omega_s \frac{t_d}{T_m} \text{ [rad/s]} \quad (4)$$

The combination of Equations (2) and (4) yields:

$$\omega_{dif} = \frac{4\omega_s h}{cT_m} \text{ [rad/s]} \quad (5)$$

which gives a direct relation between the detection height h and the measured angular frequency difference $\omega_{dif}$. This angular frequency difference can easily be detected by multiplying the received signal by the transmitted signal, by means of the mixer 7.

$$S_M(t) = S_T(t) S_R(t)$$

$$= \frac{1}{2} A_R A_T \cos(\omega_s H(t)t + \omega_c t_d - \omega_s H(t - t_d)t + \omega_s H(t - t_d)t_d) +$$

$$\frac{1}{2} A_R A_T \cos(2\omega_c t + \omega_s H(t)t - \omega_c t_d + \omega_s H(t - t_d)t - \omega_s H(t - t_d)t_d)$$

At low altitudes $t_d \ll T_m$ it can be assumed that H(t) is constant within the time interval $[t-t_d, t]$ and hence H(t) equals $H(t-t_d)$. The equation becomes:

$$S_M(t) = \frac{1}{2} A_R A_T \cos(\omega_c t_d + \omega_s H(t) t_d) + \frac{1}{2} A_R A_T \cos(2\omega_c t + 2\omega_s H(t) t - \omega_c t_d - \omega_s H(t) t_d) \quad (6)$$
$$= S_{M1}(t) + S_{M2}(t)$$

The spectrum of $S_{M1}(t)$ contains the low frequencies while the spectrum of $S_{M2}(t)$ contains the high frequencies around $2\omega_c$. The latter term will be suppressed by filtering by the filter 8 and is not discussed further. The signal of interest is $S_{M1}(t)$:

$$S_{M1}(t) = \frac{1}{2} A_R A_T \cos(\omega_c t_d + \omega_s H(t) t_d) \quad (7)$$

Substituting H(t) results into:

$$S_{M1}(t) = \frac{1}{2} A_R A_T \cos\left(\omega_c t_d + \frac{1}{2}\omega_s t_d \pm \frac{2\omega_s t_d}{T_m} t\right) \quad (8)$$
$$= \frac{1}{2} A_R A_T \cos\left(\omega_c t_d + \frac{1}{2}\omega_s t_d \pm \omega_{dif} t\right)$$

The beat signal $S_{M1}(t)$ has a frequency that is equal to the difference of the transmitted and received frequency (equation (4)) and hence the detection height h (equation (5)).

Figure 4:
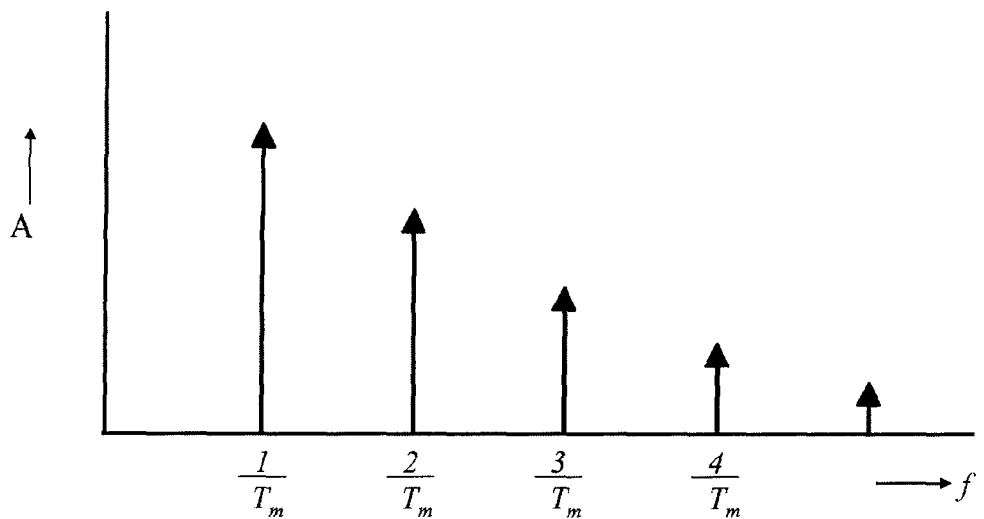
FIG. 4 shows an amplitude frequency spectrum of a first beat signal.

Since H(t) is periodic with $T_m$ also $S_{M1}(t)$ is periodic with $T_m$. The frequency spectrum of $S_{M1}(t)$ consists of harmonics with modulation frequency $f_m$. FIG. 4 shows an amplitude frequency spectrum A of a first beat signal. The signal $S_{M1}(t)$ can therefore be described with:

$$S_{M1}(t) = \frac{1}{2} a_0 + \sum_n a_n \cos(n\omega_m t) + \sum_n b_n \sin(n\omega_m t) \quad (9)$$

where:

$$a_n = \frac{2}{T_m} \int_{-\frac{T_m}{2}}^{\frac{T_m}{2}} S_{M1}(t) \cos(n\omega_m t) \, dt$$

$$b_n = \frac{2}{T_m} \int_{-\frac{T_m}{2}}^{\frac{T_m}{2}} S_{M1}(t) \sin(n\omega_m t) \, dt$$

where:
n denotes an index of harmonic component.
Therefore, the processing unit 6 performs the step of providing a beat signal having a frequency that is equal to the frequency difference between the transmitted signal and the received signal, and the step of determining harmonics of the beat signal. Because $S_{M1}(t) = S_{M1}(-t)$ all $b_n$ components are zero. The amplitude coefficient of the harmonics components $a_n$ can be written as:

$$a_n = \frac{\frac{1}{2} A_R A_T \omega_s t_d}{\left(\frac{1}{2}\omega_s t_d + \frac{1}{2} n\pi\right)\left(\frac{1}{2}\omega_s t_d - \frac{1}{2} n\pi\right)} \quad (10)$$
$$\left[\cos\left(\omega_c t_d + \frac{1}{2} n\pi\right) \sin\left(\frac{1}{2}\omega_s t_d - \frac{1}{2} n\pi\right)\right]$$

$A_R$ is also a function of the height h:

$$A_R = C \cdot \frac{\lambda_c}{h} \quad (11)$$

where:
$\lambda_c$: Wavelength of the transmitter central frequency [m]
C: Constant, depending on hardware properties
Equation (10) can be re-written as:

$$a_n = \underbrace{\left(\frac{A_R A_T \omega_s t_d}{\omega_s t_d + n\pi}\right)}_{Amplitude} * \underbrace{\left(\frac{\sin\left(\frac{1}{2}\omega_s t_d - \frac{1}{2} n\pi\right)}{\frac{1}{2}\omega_s t_d - \frac{1}{2} n\pi}\right)}_{Sinc} * \underbrace{\left(\cos\left(\omega_c t_d + \frac{1}{2} n\pi\right)\right)}_{Carrier} \quad (12)$$

Figure 5:
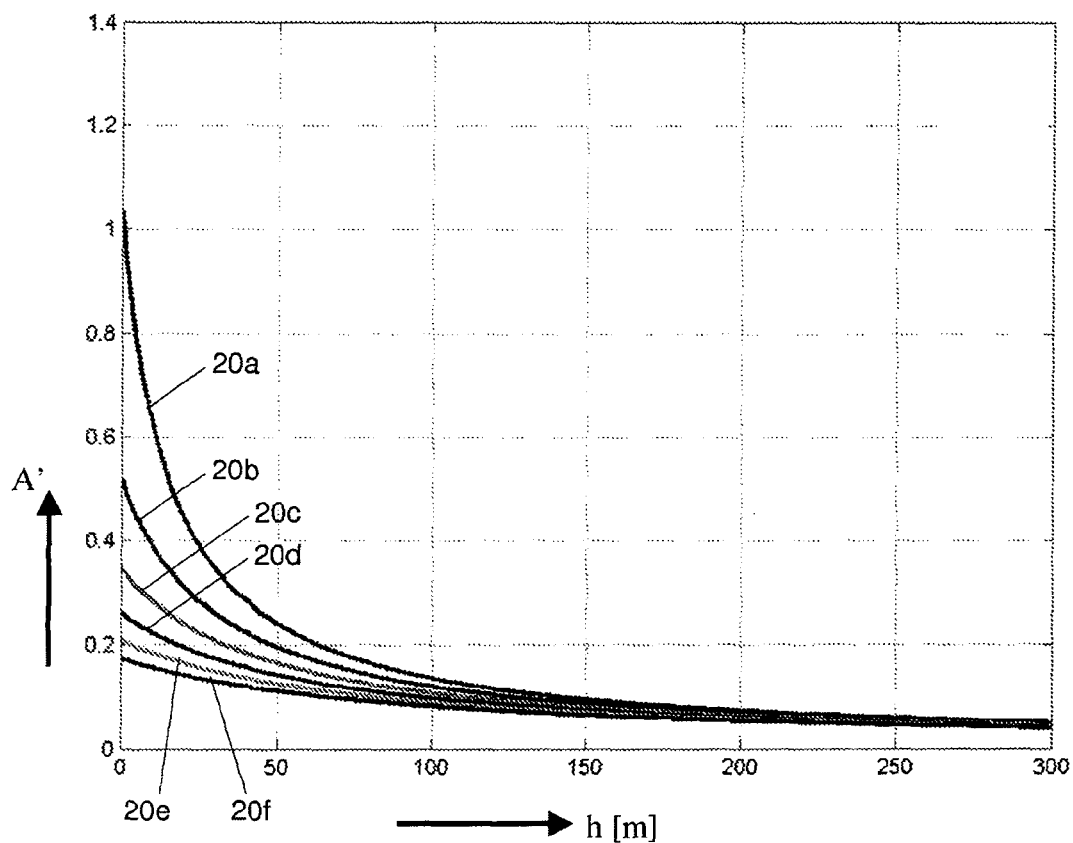
FIG. 5 shows a diagram with an amplitude factor of an amplitude coefficient of beat signal harmonics.

It is shown in Equation (12) that the amplitude coefficient $a_n$ of harmonic component n can be seen as a modulation function itself. So the coefficient $a_n$ can be divided into three parts:

Amplitude
The first part of the coefficient can be interpreted as amplitude. This amplitude part A' is shown in FIG. 5. Here, the amplitude factor is shown as a graph 20a-f for n=1 (fundamental) to n=6, respectively, as a function of the height h.

Figure 6:
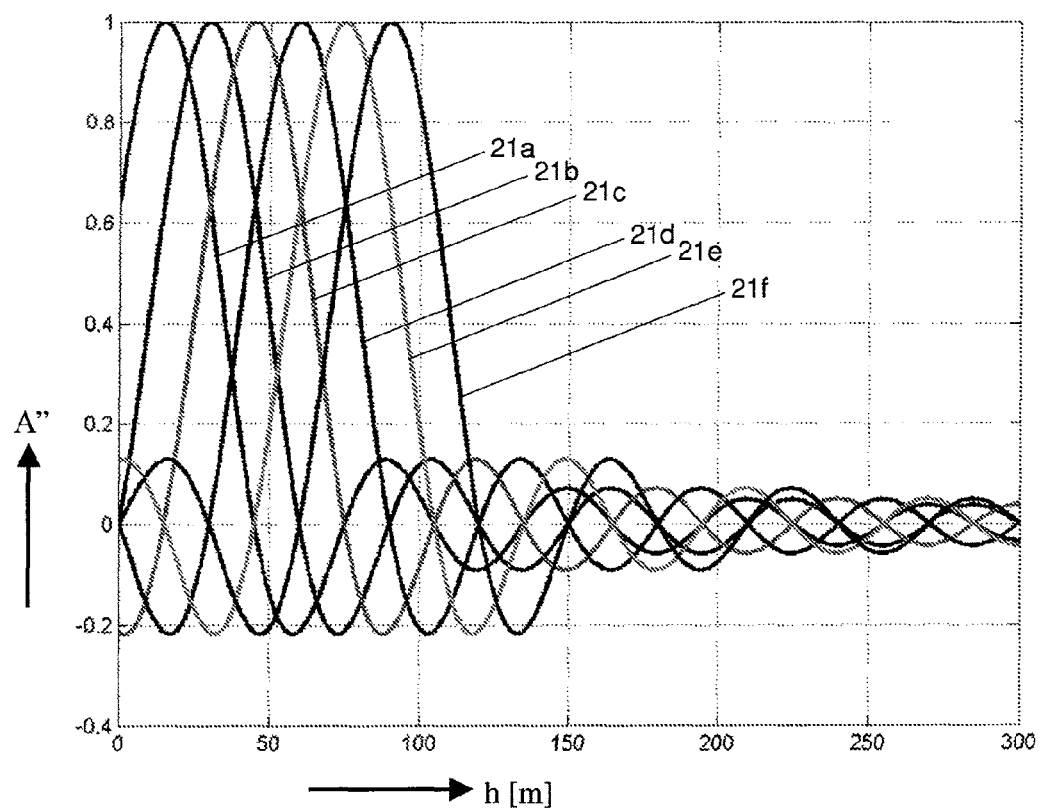
FIG. 6 shows a diagram with a sinc factor of an amplitude coefficient of beat signal harmonics.

Sinc Function
The sine function (sin (x)/x) giving a peak for a given delay and hence a given height, as is shown in FIG. 6 showing a sine factor A" of an amplitude coefficient of beat signal harmonics as a function of the height h. Again, the graph 21a-f corresponds to the harmonics order n=1, ..., 6, respectively.

Harmonic Carrier
The presence of the harmonic carrier is due to the fact that a standing wave pattern will develop between the FMCW radar transceiver and the ground. When the FMCW radar transceiver moves to the ground a half wavelength (of the transmitter centre frequency), the amplitude of $a_n$ moves from maximum to minimum and vice versa. This carrier frequency can alternatively be interpreted as the Doppler frequency that is generated when the FMCW radar transceiver moves towards the ground.

Figure 7:
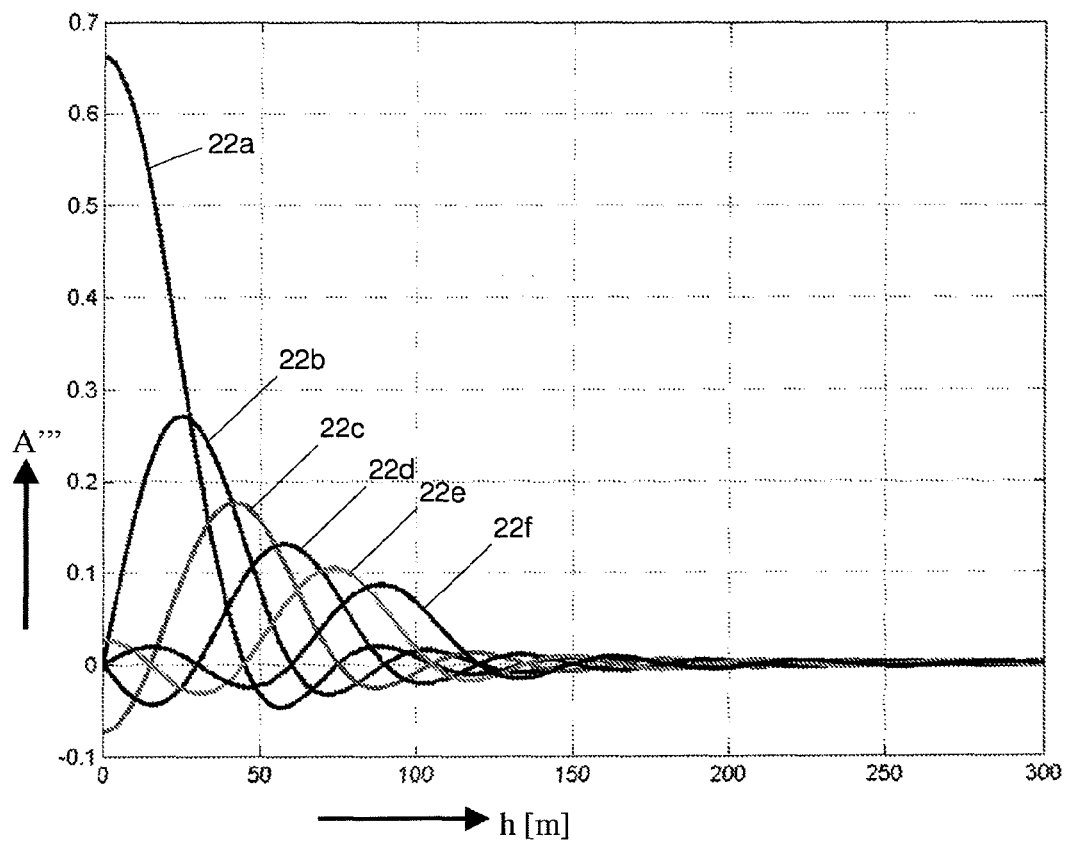
FIG. 7 shows a diagram with the product of the amplitude factor and the sinc factor shown in FIGS. 5 and 6.

The amplitude and sinc part of function $a_n$ can be combined, which result in the graphs 22a-f corresponding to the harmonics order n=1, ..., 6, respectively, shown in FIG. 7 showing the product A''' of the amplitude factor and the sinc factor shown in FIGS. 5 and 6. It is clear that each harmonic component peaks at a given height and that other harmonics are zero at that height. For example, at 45 meter $a_3$ is maximum, where $a_1$ and $a_5$ are zero. This fact can be used to detect a given height.

When the amplitude of the sinc part, as shown in FIG. 7, changes sign, a π rad phase shift occurs in the harmonic signal. These phase shifts occur at regular intervals, except at the main lobe of the sinc function. This phenomenon can be used to detect the height. For example, FIG. 7 shows that the second and fourth harmonic have a π rad phase difference above 60 meter and below 30 meter. Between 30 and 60 meter the second and fourth harmonic are in phase (both sinc parts are positive). The first (=fundamental) and third harmonic have a phase difference of π rad above 45 meter and below 15 meter. Between 15 and 45 meter the first and third harmonic are in phase.

Figure 8:
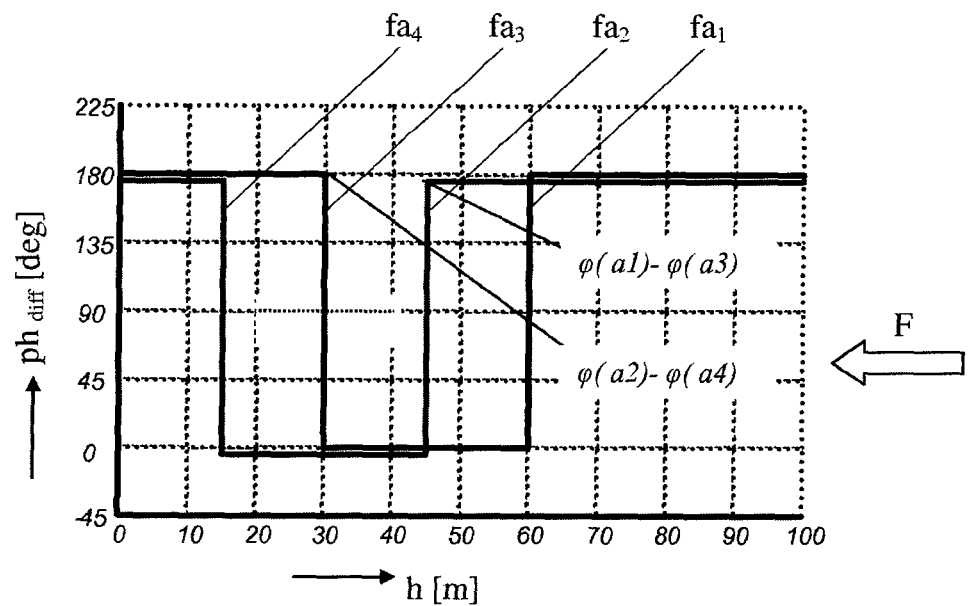
FIG. 8 shows a diagram with a graph of differential phases as a function of height.

During operation of the radar system, the four phases $\phi(a_n)$ of the first four harmonics may be computed. Then the differential phases φ(a₂)−φ(a₄) and φ(a₁)−φ(a₃) can be computed. The behaviour of both differential phases ph$_{diff}$ as a function of height is shown in FIG. 8. As can be seen, differential phase shifts f$_{a1}$–f$_{a4}$ occur at four heights. Each of these differential phase shifts can be used as a height detection event. Using the differential phase shift information, the height at the differential phase shift of φ(a₂)−φ(a₄) can be determined. To increase the robustness against false detections a pre-amble can be used: first a differential phase shift of φ(a₁)−φ(a₃) must be detected before a differential phase shift of φ(a₂)−φ(a₄) is expected to occur to perform a height detection when the height decreases in a substantially monotone manner, in a direction of flight F. In this context it is noted that also phase information of further or other harmonics may be used, e.g. phase information of the fifth and sixth harmonic.

Thus, the processing unit 6, more specifically the processor 9, is arranged for using phase shift information of at least one of said harmonics for determining a distance between the radar system and the reflecting surface.

As mentioned above, a differential phase shift is used as a height detection event. The height at which these events occur can be altered by changing the angular sweep frequency $\omega_s$. This can be deducted from Equation (12) when analyzing the phase relationship between, for example, the harmonics $a_2$ and $a_4$.

During descent, before $a_4$ reaches its peak, both $a_2$ and $a_4$ are not in phase, see FIG. 7. Between the peaks of $a_2$ and $a_4$, $a_2$ and $a_4$ are in phase. After $a_2$ reaches its peak, the phases of $a_2$ and $a_4$ are again opposite. I.e. the height to be detected is reached when $a_2$ reaches its peak. Equation (12) for $a_2$ yields:

$$a_2 = \left(\frac{A_R A_T \omega_s I_d}{\omega_s I_d + 2\pi}\right) * \left(\frac{\sin\left(\frac{1}{2}\omega_s I_d - \pi\right)}{\frac{1}{2}\omega_s I_d - \pi}\right) * (\cos(\omega_c I_d + \pi)) \quad (13)$$

The harmonic $a_2$ reaches its peak when:

$$\frac{1}{2}\omega_s I_d - \pi = 0 \Leftrightarrow$$

$$\frac{1}{2}\omega_s I_d = \pi \Leftrightarrow$$

$$\omega_s = \frac{2\pi}{I_d} \Leftrightarrow$$

$$\omega_s = \frac{c\pi}{h}$$

In conclusion: the detection height h can be changed by changing the angular sweep frequency $\omega_s$. This can easily be implemented by using a voltage controlled oscillator to generate the sweep signal.

Any used hardware will exhibit some FM demodulation capability. Even in free space, with no objects present in the vicinity of the fuze hardware, the harmonics $a_n$ will have a given amplitude. This effect is caused by reflections of the transmitted signal at the antenna connection. The reflected signal is fed to the mixer, as any received signal would do. Due to the difference in path-length (between the "regular" path generator-mixer and the "spurious" path generator-antenna-mixer) FM detection will take place. The FM demodulation spurious will manifest itself as a strong target echo at (near) zero distance and zero velocity. The effect of spurious can be taken into account by:

$$S(t) = \frac{1}{2}a_0(t) + \sum_n a_n(t)\cos(n\omega_m t) + \sum_n FM_{spurious,n}\cos(n\omega_m t) \quad (14)$$

where $FM_{spurious,n}$ is a constant value representing the $n^{th}$ harmonic of FM demodulation spurious.

Figure 9:
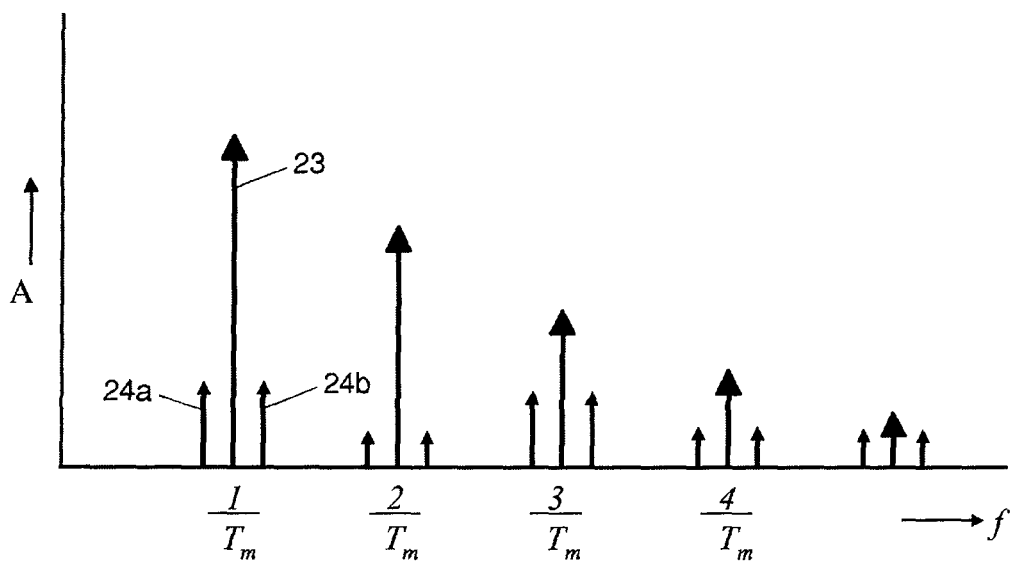
FIG. 9 shows an amplitude frequency spectrum of a second beat signal.

The FM demodulation spurious is frequency dependent in amplitude and phase, making the exact FM demodulation effect very unpredictable and virtually impossible to compensate for. However, the spurious is free of Doppler, which enables it to be separated from the Earth's reflection. The spectrum of the receiver signal combined with FM demodulation spurious might look like the spectrum given in FIG. 9 showing an amplitude frequency spectrum of a second beat signal. A central signal 23 is caused by internal reflections at the transceiver while the offset signals 24 represent the Doppler shifted harmonic components.

Below, an implementation of a specific algorithm is described in detail. Other implementations are also possible. The input of the algorithm is a sampled and digitized beat signal. Before the actual height detection can be performed, it is advantageously first assured that the beat signal contains sufficient information. Therefore, in a first step, a signal-to-noise ratio (SNR) of a differential phase is determined and it is checked whether the SNR ratio exceeds a predetermined threshold value.

The sub-steps necessary to compute the differential phases φ(a₁)−φ(a₃) and φ(a₂)−φ(a₄) may include applying a filter bank to generate four real parts and four imaginary parts of the beat signal in base band, applying a zero Doppler remover, calculating the phase of the four complex signals, and computing differential phases. These sub-steps can be used for the SNR computation as well as for the height detection. In the following, the above-mentioned sub-steps are described in more detail.

The filter bank has as input the sampled and digitized beat signal. The filter bank may be implemented using a cosine modulated filter bank which output consists of four complex signals representing the first four harmonics of the input signal. The complex output of the $n^{th}$ harmonic is computed by filtering the spectrum around the $n^{th}$ harmonic and simultaneously shifting the spectrum to the zero centre frequency. After filtering, the beat signal is separated in four real parts and four imaginary parts.

Due to the FM demodulation spurious there is a large DC component (the zero Doppler) present at all outputs of the filter bank. This component is removed by applying a high pass filter. This filter is applied to the four real parts and to the four imaginary parts resulting in eight zero-Doppler removers (filters).

In a next sub-step, for all four harmonic components the phase of the complex signal is computed. Then, the differential phases φ(a₁)−φ(a₃) and φ(a₂)−φ(a₄) are computed forming a basis for performing the detection.

At high altitudes, the received signal contains no or only a small portion of the reflected signal. The behaviour of the harmonic components $a_{1-4}$ is at least partially determined by the height: at large heights the harmonic components $a_{1-4}$ are small and dominated by noise. Hence also the phase difference is dominated by noise: the values of the differential phases φ(a₁)−φ(a₃) and φ(a₂)−φ(a₄) are more or less uniform distributed across 2π rad at high altitudes. When descending with the radar system, the reflected signal from the Earth's surface will gain in strength and hence the differential phases will start to be either 0 or π rad as is expected from analysing e.g. FIG. 8. This phase however will have an offset called the reference phase $\phi_{ref}$. The amount of measurements at $\phi_{ref}$ and $\phi_{ref}+\pi$ is used as a measure for the Signal to Noise Ratio (SNR). Computation of the SNR is explained below.

The inputs of the SNR computation are the differential phases. The differential phases range between 0 and $2\pi$ rad. To determine the SNR, the calculated differential phases are distributed over K sets, i.e. for every measurement the value '1' is added to the set corresponding to the computed differential phase.

After classification, all K sets are low-pass filtered to reduce noise. Based on the results of filtering, the signal strength is computed. The set k∈K with the highest value is considered to be the reference set and the value of this set is considered to be A signal strength (S). A noise strength (N) is measured in the sets that do not contain the signal, i.e. all sets, excluding the reference set k and its $\pi$ rad counterpart. The noise strength is averaged across these sets.

When the signal strength S and the noise strength N have been measured, a SNR ratio is determined, the signal strength is compared with the noise level. Sufficient SNR is assumed to be reached when the signal level exceeds the noise level by some amount, e.g. when the signal to noise ration exceeds a predetermined level.

When the SNR is sufficient, the detection part of the algorithm is started. The detection part of the algorithm may comprise a number of sub-steps.

In a first sub-step, a reference phase can now be computed. Note that it is in general not possible to predict the value of the reference phase due to imperfections in the analogue electronics. All differential phases are corrected with the reference phase such that the resulting average phase difference is either ½π rad or 1½π rad.

In a second sub-step, all shifted differential phases are classified into one of the sets [0, π) and [n, 2π).

In a third sub-step, after classification, both sets are low-pass filtered to reduce noise. The resulting signals, called the gate signals, contain the 0→1 and 1→0 transitions related to the phase shifts as shown in FIG. 8.

In a fourth sub-step, both gate signals are fed into a state machine and are evaluated for the $\pi$ rad phase shifts. The state machine starts when sufficient SNR is reached in SNR(13) and SNR(24). The argument 13 indicates the phase difference between the third and first harmonic while the argument 24 indicates the phase difference between the fourth and second harmonic. Before transitioning to a next state, first the gate signal of $\phi(a_2)-\phi(a_4)$ must exceed a threshold. This check reduces the probability of false detections. When also the gate signal of $\phi(a_1)-\phi(a_3)$ exceeds a threshold the state '24 and 13 open' is entered. This is a pre-amble for the actual height detection. A transition of the gate signal $\phi(a_2)-\phi(a_4)$ results in the detection of the height.

Simulations have been performed to validate the performance of the algorithm. A signal model is used that incorporates the speed of descent, surface reflection coefficient, surface scattering, FM demodulation spurious, noise and quantization effects. For each set detection height various signal are generated while taking into account the effects of the delay of the filter stages.

Figure 10A:
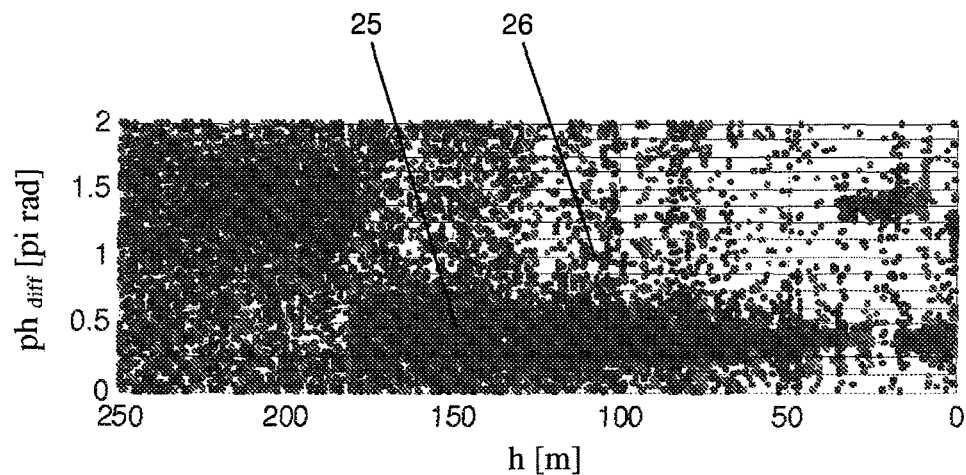
FIG. 10a shows phase difference signals as a function of height.
Figure 10B:
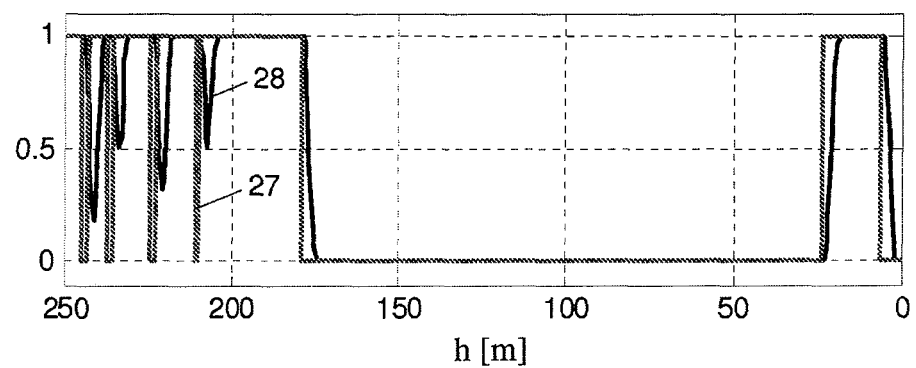
FIG. 10b shows a second gate signal.
Figure 10C:
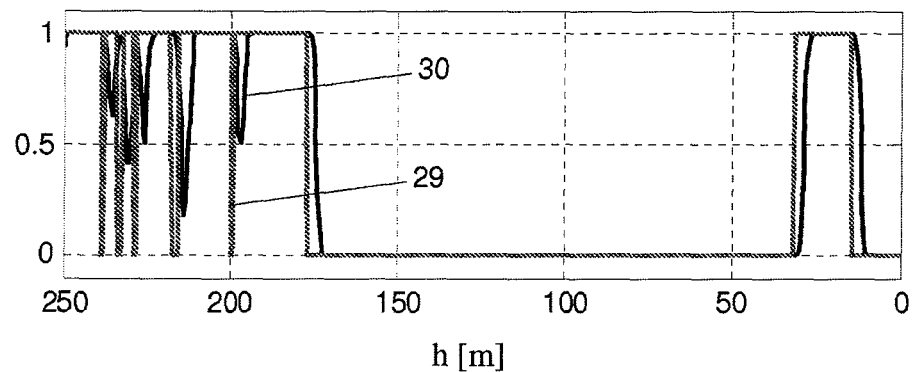
FIG. 10c shows a first gate signal.
Figure 10D:
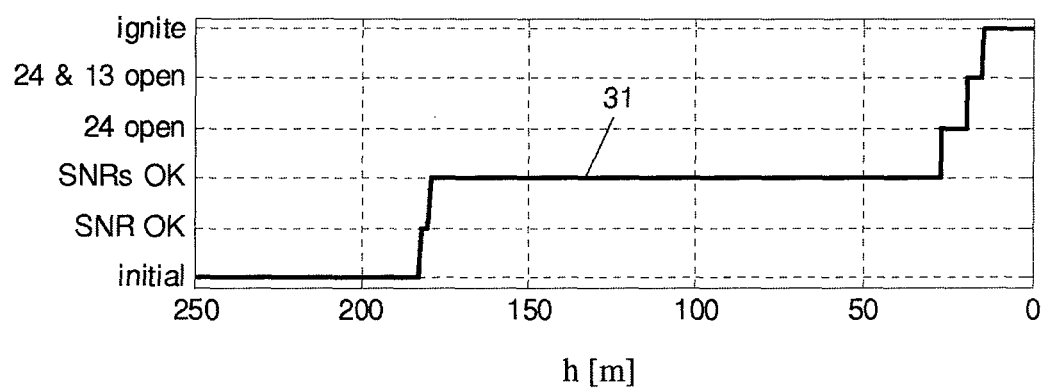
FIG. 10d shows an internal state signal.

FIGS. 10a-d show the behaviour of some internal signals as a function of height. Specifically, FIG. 10a shows phase difference signals as a function of height, in particular all $\phi(a_1)-\phi(a_3)$ phases 25 and all $\phi(a_2)-\phi(a_4)$ phases 26 as a function of height. At larger heights (at the left) the phases are randomly distributed in the interval [0, 2π). During descent the phases concentrate around two phases. At that point the SNR is sufficient to start the detection algorithm. At the moment sufficient SNR is reached the phases in the top plot are shifted to the reference phase. FIGS. 10b-c show the gate signal for respectively the phase differences $\phi(a_1)-\phi(a_3)$ and $\phi(a_2)-(a_4)$. These signals are the filtered versions of FIG. 10a. Both the filtered signal 28, 30 as well as the unfiltered signals 27, 29 have been shown. The fourth plot shows the internal state signal 31 of the algorithm. The states are:

initial: start of the algorithm
SNR OK the phase difference $\phi(a_1)-\phi(a_3)$ or the phase difference $\phi(a_2)-\phi(a_4)$ has reached sufficient SNR.
SNRs both phase differences have reached sufficient SNR.
24 open: 0→1 transition of a firstgate signal $(a_2)-\phi(a_4)$.
24 and 13 open: 0→1 transition of a second gate signal $\phi(a_1)-\phi(a_3)$.
ignite: 1→0 transition of the gate signal $\phi(a_2)-\phi(a_4)$.

The simulations are repeated for various signals. The average deviation between set height and detected height is below 10% even under realistic conditions including low surface reflectivity, surface scattering, FM demodulation spurious, noise and quantization effects.

Figure 11:
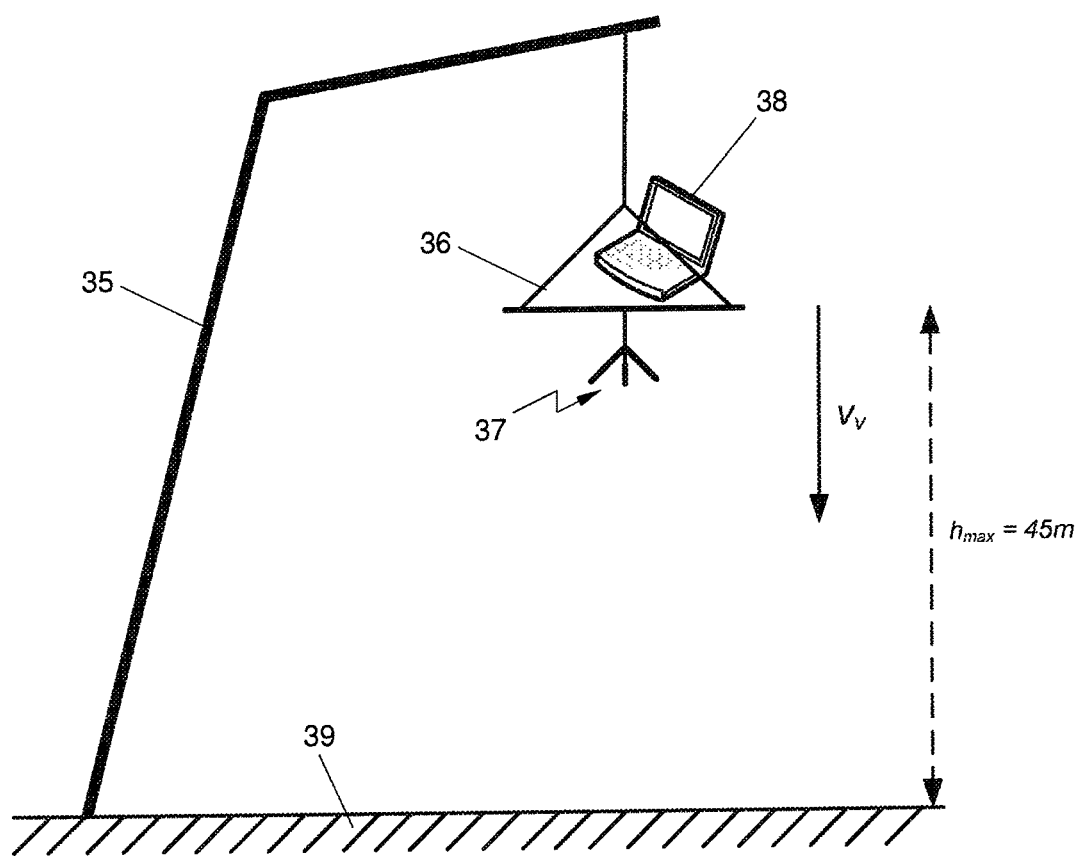
FIG. 11 shows a schematic view of a test set-up.
Figure 12A:
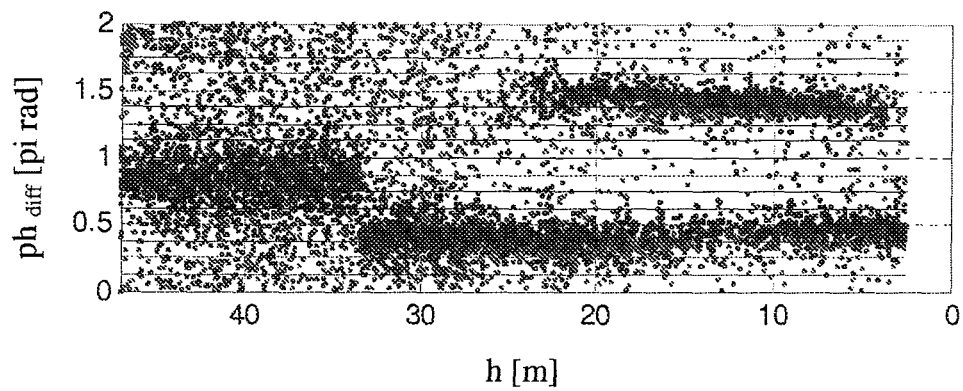
FIG. 12a shows validation phase difference signals as a function of height.
Figure 12B:
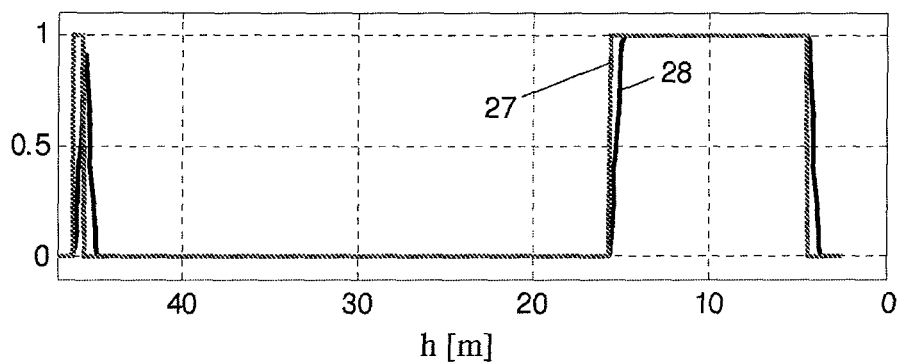
FIG. 12b shows a second gate validation signal.
Figure 12C:
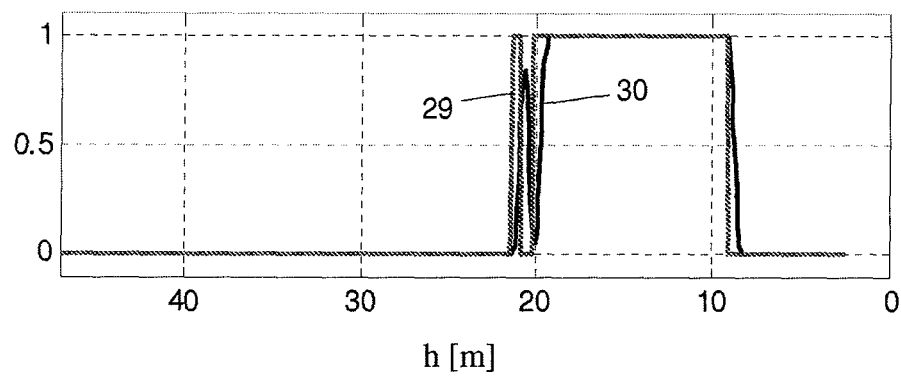
FIG. 12c shows a first gate validation signal.
Figure 12D:
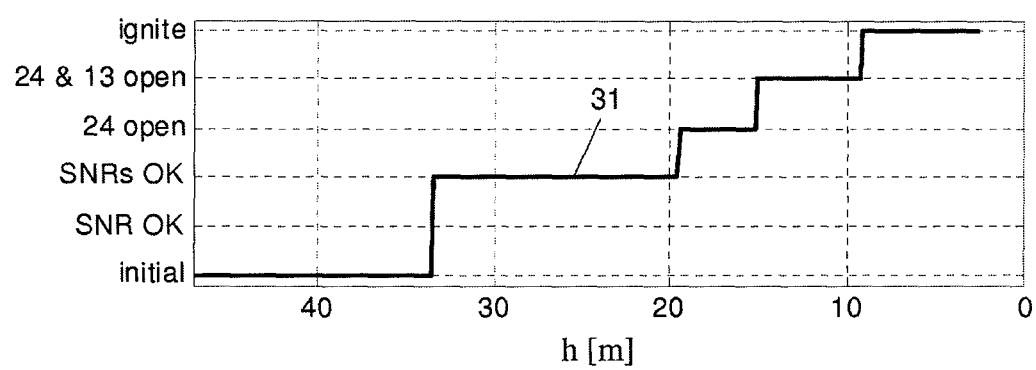
FIG. 12d shows an internal state validation signal.

Validation have been performed to validate the performance of the algorithm with real signals. These signals have been recorded with experimental electronics performing a descent using a large hoist crane, see FIG. 11 showing a schematic view of a test set-up. Here, a crane 35 carries a platform 36 containing the radar system with the transceiver module 37 and the processing unit 38. During the test, the platform 36 moves downwards to the Earth's surface 39 having a vertical velocity $v_v$. Relevant parameters such as sweep frequency, sweep repetition rate and sample frequency are scaled to the actual descent speed of the crane. Therefore, the filters of the harmonic filter bank and the filter for the zero-Doppler remover were scaled to account for these differences. The experiments cover two types of surface: flat meadowland and a wooded hill (about 3 meters height). Eight signals were recorded. FIGS. 12a-d show the behaviour of some internal signals as a function of height, similar to FIG. 10a-d. The detection height was set to be 10 m. The average detection height was 9.15 m with a standard deviation of 0.57 m.

Figure 13:
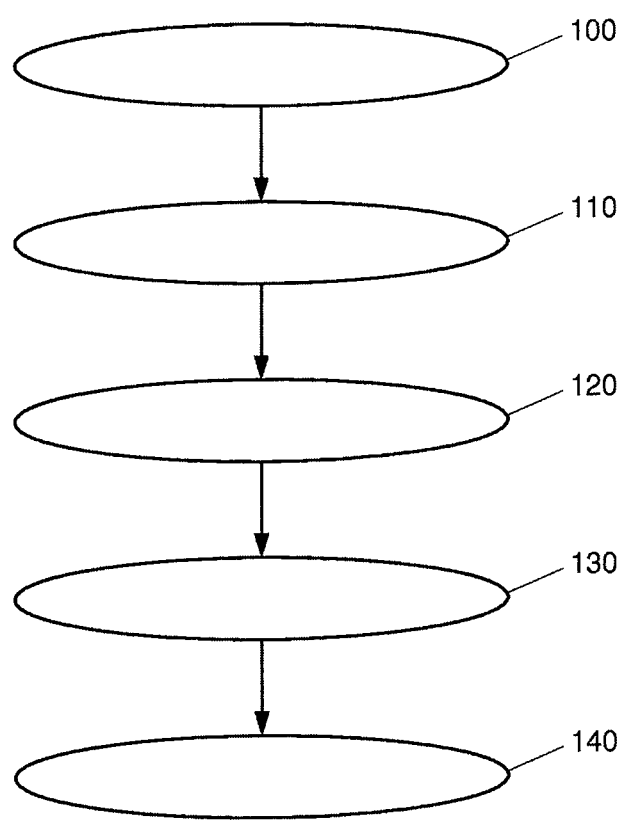
FIG. 13 shows a flow chart of an embodiment of a method according to the invention.

FIG. 13 shows a flow chart of an embodiment of the method according to the invention. A method is used for detecting a distance between a radar system and a reflecting surface. The method comprises the steps of transmitting (100) a frequency modulated continuous wave (FMCW) radar signal from the radar system, receiving (110) a reflected FMCW radar signal being the transmitted signal that has been reflected by the reflecting surface, providing (120) a beat signal having a frequency that is equal to the frequency difference between the transmitted signal and the received signal, determining (130) harmonics of the beat signal, and using (140) phase shift information of at least one of said harmonics for determining a distance between the radar system and the reflecting surface.

The method for detecting a distance between a radar system and a reflecting surface can be performed using dedicated hardware structures, such as FPGA and/or ASIC components. Otherwise, the method can also at least partially be performed using a computer program product comprising instructions for causing a processing unit or a computer system to perform the above described steps of the method according to the invention. All processing steps can in principle be performed on a single processor. However it is noted that at least one step can be performed on a separate processor, e.g. the step of providing a beat signal and/or the step of determining harmonics of the beat signal.

The method uses the phase information hidden in the harmonics of the signal resulting from mixing the transmitted and received signal. This makes the algorithm virtual independent of surface scatter, improves the accuracy and reduces the influences of noise. In addition, the optional application of a pre-amble gate improves the robustness against false detections. Prior to the detection of the height, the algorithm may use a sophisticated method to detect whether the signal-to-noise ratio is sufficient to start the height detection. Advances in digital signal processing capabilities allow the implementation of this innovative algorithm in real-time. In addition, implementation on a digital signal platform allows changing the detection height without changes in the design. This is in contrast with discrete implementations where filters need to be adjusted to match the detection height.

The performance of the method has been verified using simulation. A signal model was used that incorporates the speed of descent, the surface reflection coefficient, the surface scatter angle, FM demodulation spurious, noise and quantization effects. The simulation results show that the algorithm, despite the introduced distortions, performs very well. The maximum deviation from the set height was always below 10%.

To validate the new algorithm, an experimental radar system has been build. Using a hoist crane descends were performed. The results of the algorithm were comparable with the simulations: the maximum deviation from the set height was always below 10%.

Applications of this new algorithm can be found in among others avionics, military and space applications.

The invention is not restricted to the embodiments described herein. It will be understood that many variants are possible.

Other such variants will be obvious for the person skilled in the art and are considered to lie within the scope of the invention as formulated in the following claims.

The invention claimed is:

1. A method, comprising:
   transmitting, using a signal generator and antenna of a radar system, a frequency modulated continuous wave (FMCW) radar signal from the radar system;
   receiving, by the radar system, a reflected FMCW radar signal corresponding to the transmitted FMCW radar signal that has been reflected by a reflecting surface;
   obtaining, using a mixer of the radar system, a beat signal having a frequency corresponding to a frequency difference between the transmitted FMCW radar signal and the reflected FMCW radar signal;
   determining harmonics of the beat signal by Fourier decomposition; and
   determining, by a processor of the radar system, a distance between the radar system and the reflecting surface using phase shift information of at least one of the harmonics, wherein determining the distance comprises determining a phase difference between a pair of the harmonics.

2. The method according to claim 1, wherein determining the distance comprises determining multiple phase differences.

3. The method according to claim 1, further comprising setting an angular sweep frequency such that a particular phase shift in at least one of the harmonics or a particular differential phase shift between two of the harmonics corresponds to a pre-determined distance between the radar system and the reflecting surface.

4. The method according to claim 3, wherein the angular sweep frequency is set such that one of the pair of the harmonics reaches a peak at the pre-determined distance between the radar system and the reflecting surface.

5. The method according to claim 1, further comprising checking whether subsequent detected distances correspond with an expected distance evolution.

6. The method according to claim 1, further comprising checking a signal to noise ratio of the phase shift information prior to determining the distance.

7. The method according to claim 6, wherein determining the distance is started when the signal to noise ratio of the phase shift information exceeds a predetermined level.

8. The method according to claim 6, wherein checking the signal to noise ratio of the phase shift information comprises distributing calculated differential phases over K sets, low-pass filtering the K sets, selecting a reference set, among the K sets, having a highest value for computing a signal strength, and computing a noise strength measured in at least one of the K sets, wherein K is a positive integer.

9. The method according to claim 1, wherein determining the distance comprises detecting a differential phase shift, the differential phase shift being a shift in the phase difference between the pair of the harmonics.

10. The method according to claim 9, wherein the differential phase shift occurs when a harmonic of the pair of the harmonics reaches a peak.

11. A radar system, comprising:
   a transmitter, comprising a signal generator and antenna, the transmitter configured to transmit a frequency modulated continuous wave (FMCW) radar signal;
   a receiver configured to receive a reflected FMCW radar signal corresponding to the transmitted FMCW radar signal that has been reflected by a reflecting surface; and
   a processing unit, comprising a mixer and processor, the processing unit configured to:
      obtain, using the mixer, a beat signal having a frequency corresponding to a frequency difference between the transmitted FMCW radar signal and the reflected FMCW radar signal;
      determine harmonics of the beat signal by Fourier decomposition; and
      determine, using the processor, a distance between the radar system and the reflecting surface using phase shift information of at least one of the harmonics, wherein determining the distance comprises determining a phase difference between a pair of the harmonics.

12. The radar system of claim 11, wherein determining the distance comprises determining multiple phase differences.

13. The radar system of claim 11, wherein the processing unit is further configured to set an angular sweep frequency such that a particular phase shift in at least one of the harmonics or a particular differential phase shift between two or the harmonics corresponds to a pre-determined distance between the radar system and the reflecting surface.

14. The radar system of claim 11, wherein determining the distance is started when a signal to noise ratio of the phase shift information exceeds a predetermined level.

15. A non-transitory computer readable storage medium having computer-executable instructions stored therein that, when executed by a processor of a processing unit of a radar system that comprises a signal generator, antenna, and mixer, cause the processing unit to:
   obtain, from the mixer, a beat signal having a frequency that corresponds to a frequency difference between a frequency modulated continuous wave (FMCW) radar signal, transmitted using the signal generator and antenna of the radar system, and a reflected FMCW radar signal corresponding to the transmitted FMCW radar signal that has been reflected by a reflecting surface;

determine harmonics of the beat signal by Fourier decomposition; and determine a distance between the radar system and the reflecting surface using phase shift information of at least one of the harmonics, wherein determining the distance comprises determining a phase difference between a pair of the harmonics; and output the distance between the radar system and the reflecting surface.

16. The non-transitory computer readable storage medium of claim 15, wherein determining the distance comprises determining multiple phase differences.

17. The non-transitory computer readable storage medium of claim 15, wherein the computer-executable instructions, when executed, further cause the processing unit to set an angular sweep frequency such that a particular phase shift in at least one of the harmonics or a particular differential phase shift between two of the harmonics corresponds to a predetermined distance between the radar system and the reflecting surface.

18. The non-transitory computer readable storage medium of claim 15, wherein determining the distance is started when a signal to noise ratio of the phase shift information exceeds a predetermined level.

\* \* \* \* \*